(12) United States Patent
Pohribnak

(10) Patent No.: US 7,744,345 B1
(45) Date of Patent: Jun. 29, 2010

(54) WIND POWER GENERATOR

(76) Inventor: Victor E. Pohribnak, P.O. Box 400, Bismarck, ND (US) 58502

( * ) Notice: Subject to any disclaimer, the term of this patent is extended or adjusted under 35 U.S.C. 154(b) by 644 days.

(21) Appl. No.: 11/818,855

(22) Filed: Jun. 18, 2007

(51) Int. Cl.
*F03D 3/04* (2006.01)
(52) U.S. Cl. .......................................... 416/9; 415/4.2
(58) Field of Classification Search ................... 416/9; 415/4.2, 4.4, 48, 49
See application file for complete search history.

(56) References Cited

U.S. PATENT DOCUMENTS 5,038,049 A * 8/1991 Kato .............................. 416/9

* cited by examiner

*Primary Examiner*—Richard Edgar

(57) ABSTRACT

A vertical axis wind turbine provides a rotor assembly which rotates on bearing assemblies affixed to a rotor shaft supported by a base, the rotor assembly having vertical blades mounted between top and bottom plates, and power takeoff means to provide power by direct mechanical linkage or to drive an electrical generator. The rotor assembly is partially enclosed by a housing. Attached to the side of the housing is a wind vane. Attached to the bottom side of the housing are rollers. The wind vane, in combination with the rollers, act to rotate the housing to a position that will permit the wind to act upon the exposed vertical blades.

5 Claims, 3 Drawing Sheets

WIND POWER GENERATOR

BACKGROUND OF THE INVENTION

1. Field of the Invention

The instant invention generally relates to a wind power generator and is more particularly concerned with a vertical axis wind turbine with a rotor assembly and rotatable housing.

2. Description of Related Art

In relation to prior art, currently existing devices that are used to recover wind power and transform it into mechanical or electrical energy can be classified, according to its axis position, as horizontal axis or vertical axis, suffering both types from several disadvantages, sufficiently overcame by the improvements of the present invention.

As is known, today's horizontal axis devices stand in general at a considerable height and are located in very high areas and almost always in the very parting planes of mountain slopes, mountain ranges or massifs, with the consequent undesired visual impact. They can also cause severe damage to wildlife, especially to flying species, due to their large blades. These negative factors are determinant for the installation of wind power plants nowadays, versus ecologist requirements. Improvements in the present invention enable a person skilled in the art to build devices with high wind power recovery, low height and not harmful to flying species.

Today's horizontal and vertical axis devices also produce a characteristic noise when the assembly blades are turning, which can become serious when considering the installation of a wind power plant with a large number of power devices. The mentioned improvements achieve a less noisy device, and therefore no noise pollution of the environment is produced when several of these devices are installed in a specific area.

The fact that periodic wind regimes differ according to place, time of day, seasons, meteorology at a given moment and topography of the site must be taken into account when deciding the location of today's wind power recovery devices. However, the features of the device to which the improvements of the present invention apply enable to place it, without any difficulty or performance reduction, in areas with high or low wind speed, and regardless of the wind direction.

The improvements of the present invention enable to reduce the main drawbacks of vertical axis wind turbines, such as mechanical fatigue and the presence of natural resonance frequencies, as well as the fact that rotation coupling presents variations in every cycle. Another additional problem of vertical axis devices, and also reduced with the incorporation of the present improvements, is that they require motorization in order to overcome the high breakaway torque.

Patent No. P 9300316 "Wind Turbo Generator" presents a large hopper applied to a horizontal axis wind turbine so that it is also used with low speed winds, but due to such large hopper produces a significant visual and sound impact.

Patent No. P 055984 "System to enhance the performance of a vertical axis aerogenerator" produces also an important visual impact due to the fact that it stands taller than the devices of the mentioned improvements, and has a lower performance.

SUMMARY OF THE INVENTION

In an embodiment of the present invention, a vertical axis wind turbine is provided which is used to generate electricity or to provide direct power to a mechanical device by means of a power takeoff. A rotor assembly having a top plate, and a bottom plate with vertical blades mounted to the bottom side of the top plate and the top side of the bottom plate. The vertical blades are curved on the outside edge so as to increase the thrust produced by the wind. The top plate, bottom plate and vertical blades are rotatably mounted to a vertical shaft. Wind contacting the vertical blades produces thrust on the vertical blades. Thrust on the vertical blades causes the rotor assembly to rotate. The rotation of the rotor assembly is transmitted to an electrical generator.

The top plate, bottom plate and vertical blades are partially enclosed by a housing. Attached to the side of the housing is a wind vane. Attached to the bottom side of the housing are rollers. The wind vane, in combination with the rollers, act to rotate the housing to a position that will permit the wind to act upon the exposed vertical blades.

An object of the present invention is to provide a self-starting vertical axis wind turbine which is economical in construction and which has improved mechanical reliability resulting from a reduced load on supporting structures.

Another object of the present invention is to provide a wind turbine which operates as a large gyroscope to hold itself in a vertical position and thus is less vulnerable to extreme changes of wind direction and velocity.

Yet another object of the present invention is to provide a wind turbine with a wind vane or other device to easily realign the turbine with each change in wind direction.

Yet another object of the present invention is to provide a vertical axis wind turbine whose construction adds strength to the rotor assembly.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

DETAILED DESCRIPTION OF THE PREFERRED EMBODIMENTS

Figure 1:
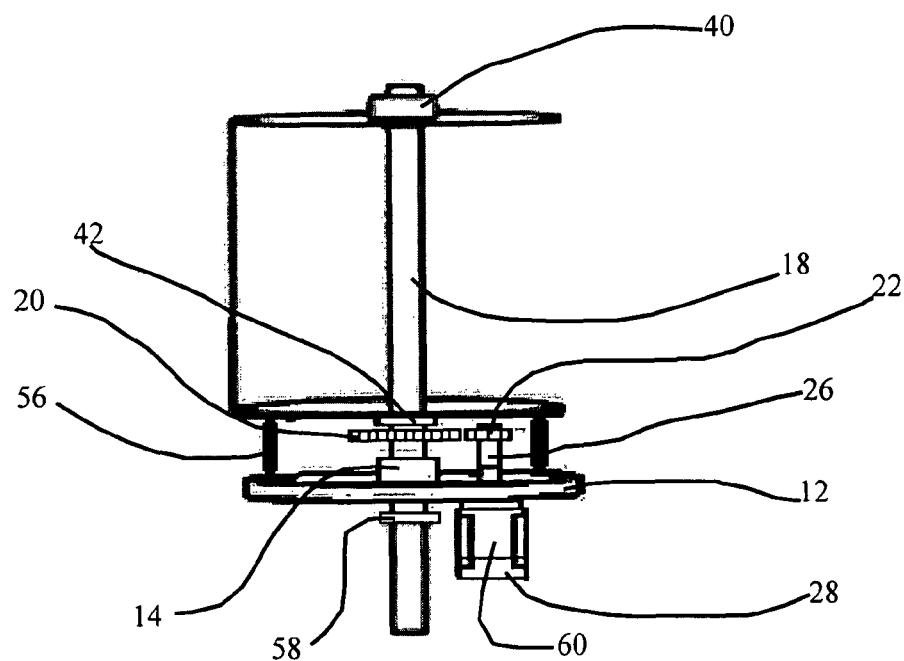
FIG. 1 is a side perspective view of the vertical axis wind turbine generator.
Figure 2:
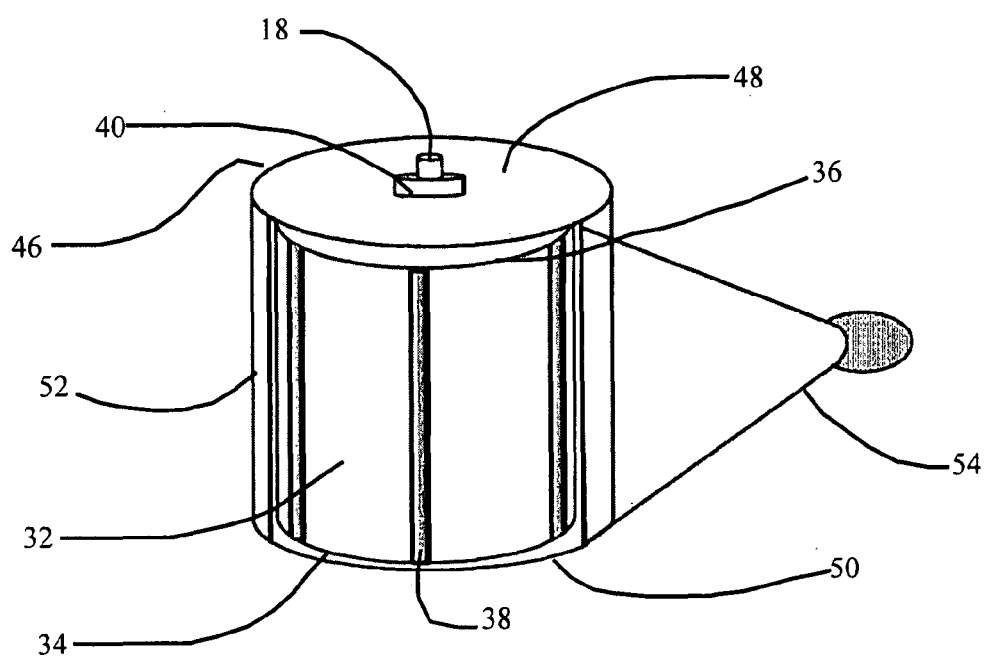
FIG. 2 is a front perspective view of the vertical axis wind turbine generator.

Referring now to the drawings, and more particularly to FIGS. 1 and 2, a vertical axis wind turbine device of the present invention is shown. A base 12 with a circular opening in the center with a thrust bearing14 disposed therein. A rotor shaft 18 extends through the thrust bearing 14 and is supported by the thrust bearing14. A drive pulley 20 rotatably mounted on the rotor shaft 18 transmits power to a driven pulley 22 by means of an endless belt 24. The driven pulley 22 is attached to an input shaft 26 of an electric generator 28. It will be clear to a person skilled in the art that the drive pulley 20, the driven pulley 22, the input shaft 26 and the endless belt 24 together form a power takeoff means. It will also be clear that alternate arrangements, including direct-drive gears and gearbox arrangements, fall within the scope and spirit of the present invention.

A rotor assembly 32 includes a bottom plate 34, a top plate 36 and vertical blades 38 which vertical blades 38 are fixedly attached to the top side of the bottom plate 34 and the bottom side of the top plate 36. The rotor shaft 18 protrudes through and is fixedly attached to an center opening in the bottom plate 34 and the top plate 36. The inside edges of the vertical blades 38 are fixedly attached to the rotor shaft 18. The outside edges of the vertical blades 38 are curved so as to increase the thrust produced by the wind.

In an alternative embodiment of the present invention, the rotor assembly 32 could be assembled without the use of a bottom plate 34 or a top plate 36. The alternative embodiment of the rotor assembly 32 would be comprised of a rotor shaft 18 which is attached to and protrudes upward from the base 12. Attached to the rotor shaft 18 are in the inside edges of vertical blades 38.

The rotor assembly 32 rotates on the rotor shaft 18 under the effects of the wind. The drive pulley 22 is attached to the rotor assembly 32 so that the rotor assembly 32 and the drive pulley 22 rotate as a single unit. The rotor assembly 32 is supported on the rotor shaft 18 by an upper bearing assembly 40 and a lower bearing assembly 42. Bearing assemblies permitting a rotor assembly to rotate on a shaft are generally known to one skilled in the art and, therefore, will not be discussed further.

The rotor assembly 32 is partially enclosed by a housing 46. The housing is comprised of a top plate 48, a bottom plate 50 and a side plate 52. The side plate 52 is of a arcuate formation with the top end of the side plate fixedly attached to approximately one-half of the outside end of the top plate 48 and with the bottom end of the side plate 52 fixedly attached to approximately one-half of the outside edge of the bottom plate 50. Fixedly attached to the exposed edge of the side plate 52 is a wind vane 54.

When the wind power generator is in operation, the vertical blades 38 on the open side of the housing 46 come into contact with the wind forcing the vertical blades 38, and attached rotor shaft 18, to turn in a counter clockwise direction. As the vertical blades 38, the vertical blades 38 pass through the enclosed housing 46. In an alternative embodiment of the invention, the vertical blades 38 would extend outward on the open side of the housing 46 and would retract as the vertical blades pass through the enclosed housing 46.

Figure 3:
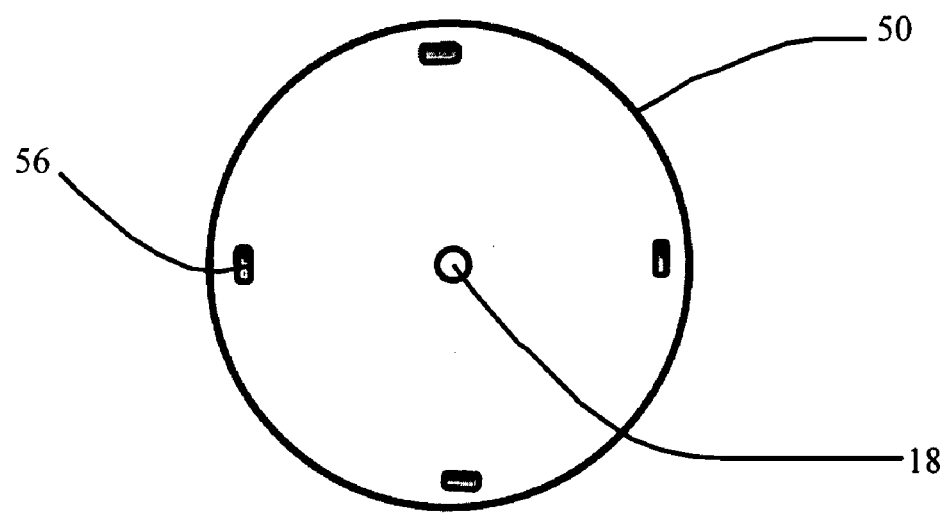
FIG. 3 is a top perspective view of the vertical axis wind turbine generator.

Referring to FIG. 3, attached to the bottom side of the housing's 46 bottom plate 50 are a plurality of rollers 56. The rollers 56 enable the housing 46 to rotate about the base 12. The wind vane 54 will act to swing the housing 46, by use of the rollers 56, to a position to permit the wind to act upon the exposed vertical blades 38. The housing 46 rotates about the rotor assembly 32.

Once the wind vane 54 and rollers 56 act to position the vertical blades 38 in the general direction of the prevailing wind, the wind vane 54 is remotely disabled. Once the wind vane 54 has been disabled, a ring gear 58 and drive motor 60 are utilized to turn the housing in the proper direction and to control the speed of the rotor shaft 18.

Figure 4:
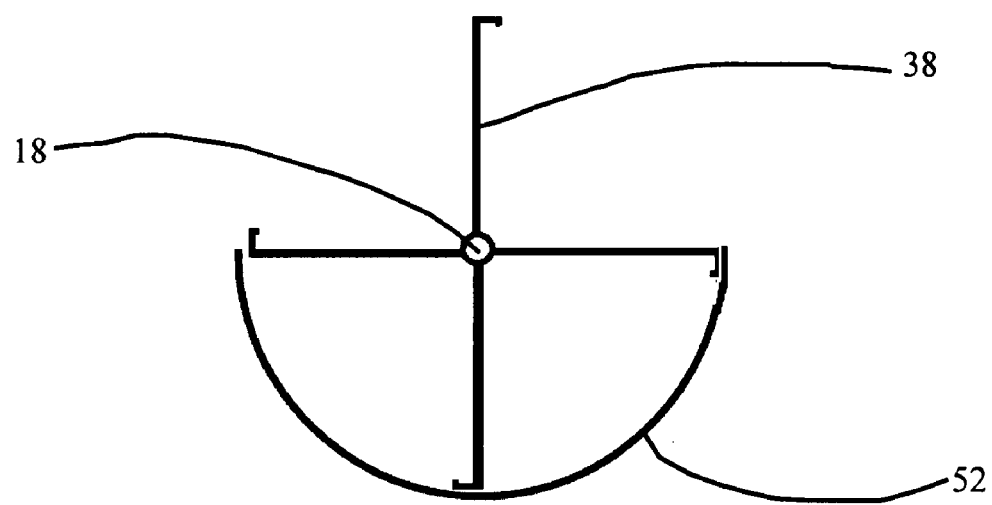
FIG. 4 is top perspective view of the vertical blades and rotor of the vertical axis wind turbine generator.
Figure 5:
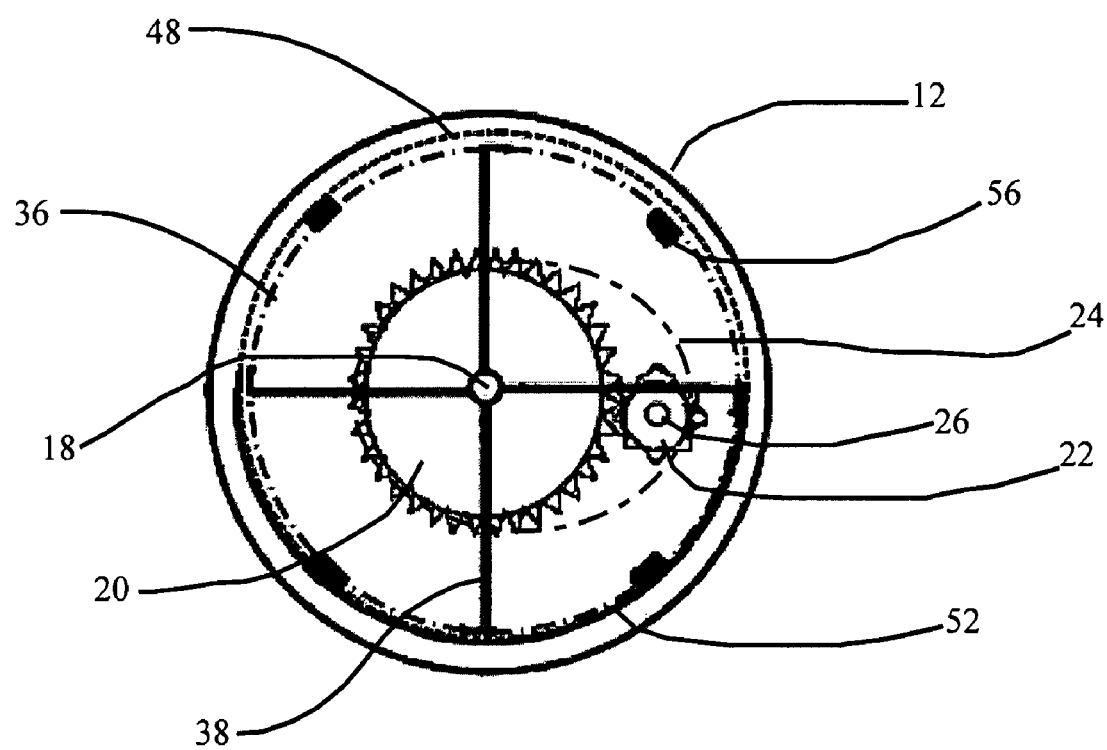
FIG. 5 is a perspective view of the vertical axis wind turbine generator illustrating the housing, rollers, vertical blades and drive pulleys.

Referring now to FIG. 4, a partial cutaway top view of the rotor assembly 32 is illustrated. The vertical blades 38, disposed about the circumference of the bottom and top plates 34, 36, undergo thrust when contacted by the wind. The vertical blades 38 rotate within the housing 46 and cause the rotor shaft 18 to rotate. As the rotor shaft 18 rotates the attached drive pulley 20 is also rotated. The rotation of the drive pulley 20 causes the driven pulley 22 to also rotate resulting in the rotation of the attached input shaft 26 which affects the production of energy in the electric generator 28.

With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, various changes and departures may be made to the invention without departing from the spirit and scope thereof. Thus it is not intended that the invention be limited to what is described in the specification and illustrated in the drawings, rather only as set forth in the claims.

| Index of Elements for Wind Power Generator |
|---|
| 12. Base |
| 14. Thrust Bearing |
| 16. |
| 18. Rotor Shaft |
| 20. Drive Pulley |
| 22. Driven Pulley |
| 24. Belt |
| 26. Input Shaft |
| 28. Electric Generator |
| 30. |
| 32. Rotor Assembly |
| 34. Bottom Plate |
| 36. Top Plate |
| 38. Vertical Blades |
| 40. Upper Bearing Assembly |
| 42. Lower Bearing Assembly |
| 44. |
| 46. Housing |
| 48. Top Plate |
| 50. Bottom Plate |
| 52. Side Plate |
| 54. Wind Vane |
| 56. Rollers |

What is claimed is:

1. A vertical axis wind turbine, comprising:
   a base having a thrust bearing disposed therein;
   a rotor shaft having an upper shaft end and a lower shaft end, the lower shaft supported by the thrust bearing;
   a rotor assembly rotatably mounted on the rotor shaft, the rotor assembly further comprising:
      a top plate;
      a bottom plate;
      a plurality of vertical blades disposed within said top plate and said bottom plate and affixed thereto; and
      power takeoff means;
   a housing assembly rotatably attached to the rotor shaft through a upper bearing assembly and a lower bearing assembly, the housing assembly further comprising:

a top plate;
a bottom plate;
a side plate;
a wind vane;
a plurality of rollers disposed upon the bottom side of the bottom plate;
a ring gear; and
a drive motor.

2. The device of claim 1, wherein said power takeoff means further comprises:

a drive pulley rigidly attached to said rotor assembly;
a driven pulley mounted on an input shaft of an electrical generator; and
an endless belt connecting said drive pulley to said driven pulley.

3. The device of claim 1, wherein the outside end of the vertical blades are slightly curved.

4. The device of claim 1, wherein the side plate of the housing is of a arcuate formation with the top end of the side plate fixedly attached to approximately one-half of the outside edge of the top plate of the housing and with the bottom end of the side plate fixedly attached to approximately one-half of the outside edge of the bottom plate of the housing.

5. The device of claim 1, wherein the plurality of rollers disposed upon the bottom side of the bottom plate of the housing allow the housing to rotate about the base.

* * * * *